(12) United States Patent
Paradiso et al.

(10) Patent No.: US 10,273,989 B2
(45) Date of Patent: Apr. 30, 2019

(54) VALVE ACTUATOR DEVICE WITH DRIVING ARM HAVING A MODULAR STRUCTURE

(71) Applicant: Rotork Fluid Systems S.r.l., Porcari (IT)

(72) Inventors: Pier Paolo Paradiso, Porcari (IT); Marco Borselli, Porcari (IT); Nicola Batistoni, Porcari (IT); Stefano Vettori, Porcari (IT); Anselmo Nicolini, Porcari (IT)

(73) Assignee: Rotork Fluid Systems S.r.l., Porcari (Lucca) (IT)

( * ) Notice: Subject to any disclaimer, the term of this patent is extended or adjusted under 35 U.S.C. 154(b) by 135 days.

(21) Appl. No.: 15/529,117

(22) PCT Filed: Nov. 25, 2015

(86) PCT No.: PCT/IB2015/059123
§ 371 (c)(1),
(2) Date: May 24, 2017

(87) PCT Pub. No.: WO2016/087997
PCT Pub. Date: Jun. 9, 2016

(65) Prior Publication Data
US 2017/0261012 A1    Sep. 14, 2017

(30) Foreign Application Priority Data
Dec. 1, 2014 (IT) .............................. TO2014A0997

(51) Int. Cl.
*F15B 15/16* (2006.01)
*F16K 31/363* (2006.01)
(Continued)

(52) U.S. Cl.
CPC .......... *F15B 15/066* (2013.01); *F16K 31/143* (2013.01); *F16K 31/363* (2013.01);
(Continued)

(58) Field of Classification Search
CPC ...... F15B 15/066; F15B 15/226; F15B 15/06; F16K 31/363; F16K 31/143; F16K 31/36;
(Continued)

(56) References Cited

U.S. PATENT DOCUMENTS 3,727,523 A * 4/1973 Gulick ...................... F03G 1/00
                                                      267/168
3,737,142 A   6/1973 Boswell et al.
(Continued)

FOREIGN PATENT DOCUMENTS

DE     2134489 A1 * 6/1972 ............ F15B 15/066
EP     0023120 A1   1/1981
EP     0569211 A1 * 11/1993 ............ F15B 15/066

OTHER PUBLICATIONS

International Search Report dated Feb. 11, 2016, for International Application No. PCT/IB2015/059123, 4 pages.

*Primary Examiner* — Marina A Tietjen
(74) *Attorney, Agent, or Firm* — RMCK Law Group PLC

(57) ABSTRACT

A valve actuator device includes a supporting body, a driving shaft, and a fluid cylinder having a body connected to one side of the supporting body. The cylinder has a rod that controls rotation of a driving arm rigidly connected to the driving shaft. Linear movement of the rod is converted into rotation of the driving arm by engagement of a cam-follower pin carried by the rod within a slot formed in the driving arm. The slot is formed in an insert that constitutes an element separate from the driving arm body and that is received and held within a seat of the driving arm body. Thus, a single main body for the driving arm is provided, having a plurality of inserts for selective mounting within the seat and are differentiated from one another in the dimensions and shape of the slot and/or in the material of the insert.

13 Claims, 9 Drawing Sheets

(51) Int. Cl.
   *F16K 31/143*  (2006.01)
   *F15B 15/06*   (2006.01)
   *F15B 15/22*   (2006.01)
   *F16K 31/14*   (2006.01)
   *F16K 31/36*   (2006.01)

(52) U.S. Cl.
   CPC ............. *F15B 15/06* (2013.01); *F15B 15/226* (2013.01); *F16K 31/14* (2013.01); *F16K 31/36* (2013.01)

(58) Field of Classification Search
   CPC ................. F16K 31/14; F16K 31/1635; F16K 31/52–31/5288; F16J 1/14; F16J 1/005; F16J 1/02
   See application file for complete search history.

(56) References Cited

U.S. PATENT DOCUMENTS

| | | | |
|---|---|---|---|
| 3,801,062 A | | 4/1974 | Am et al. |
| 4,094,231 A | | 6/1978 | Carr |
| 4,350,081 A | | 9/1982 | Fry et al. |
| 5,601,110 A | * | 2/1997 | Rembert ............... F15B 15/261 137/316 |

* cited by examiner

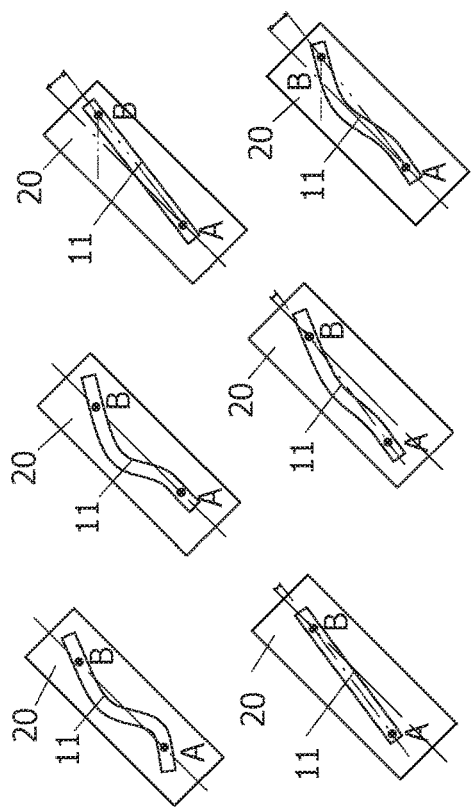
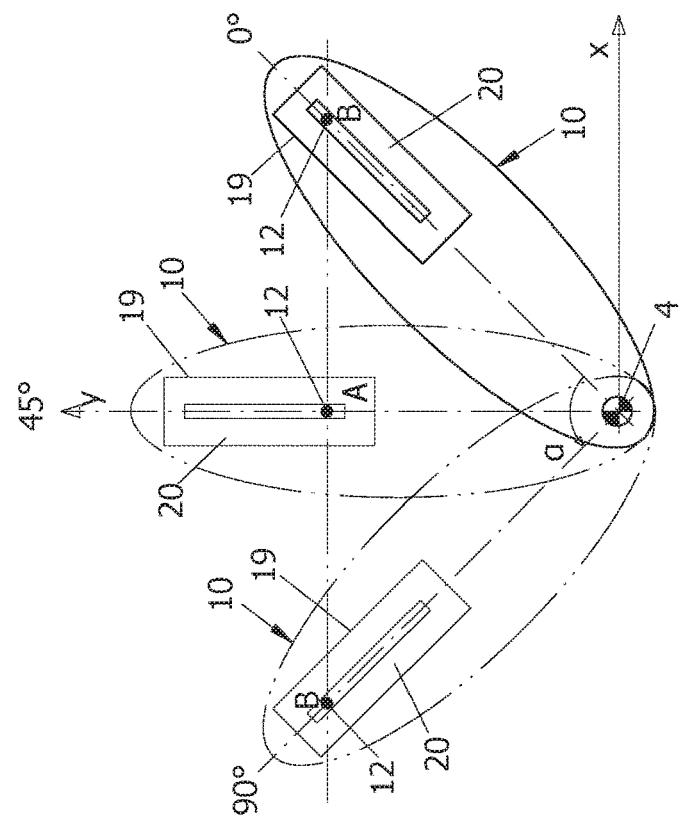
FIG. 5

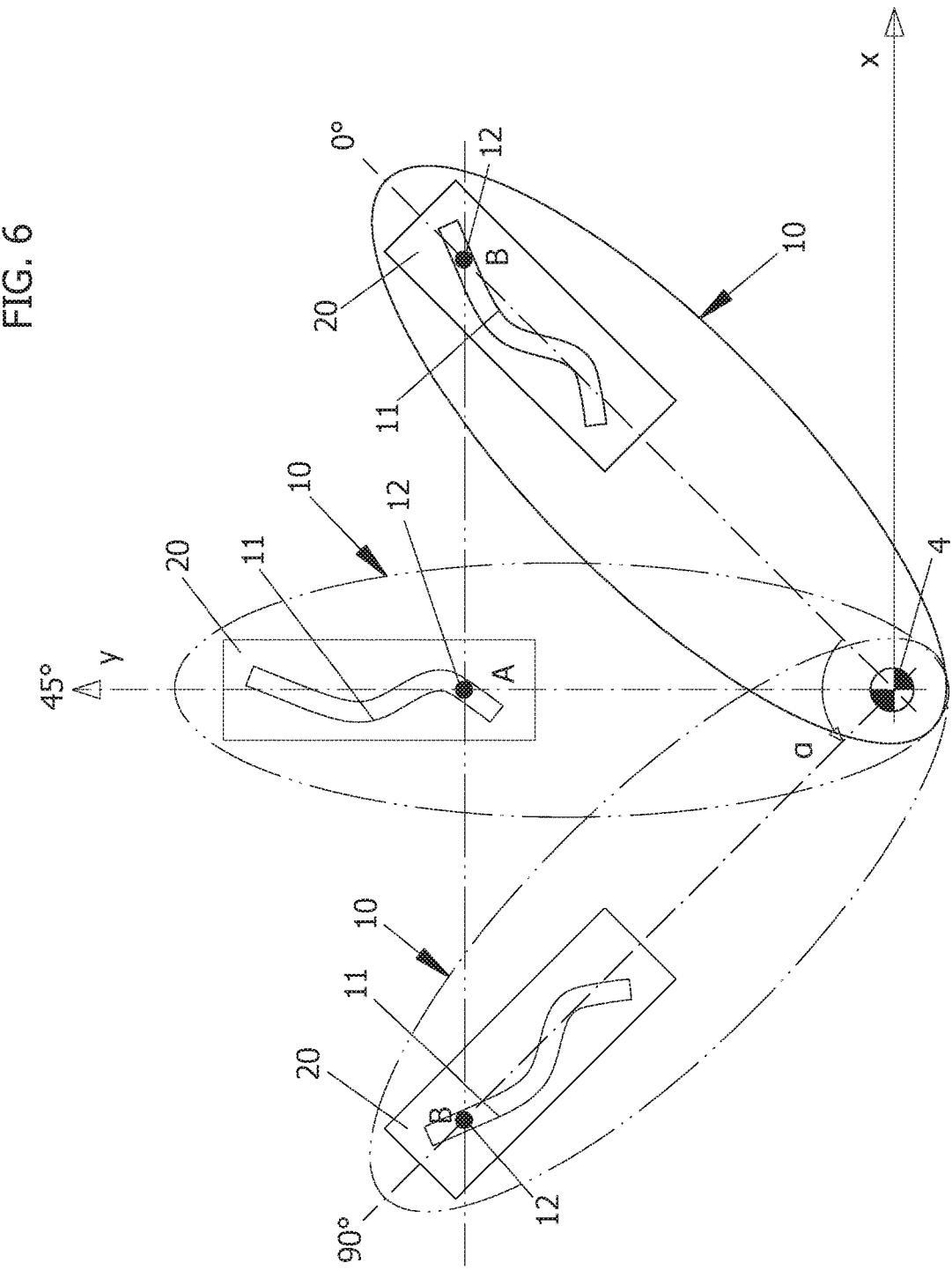

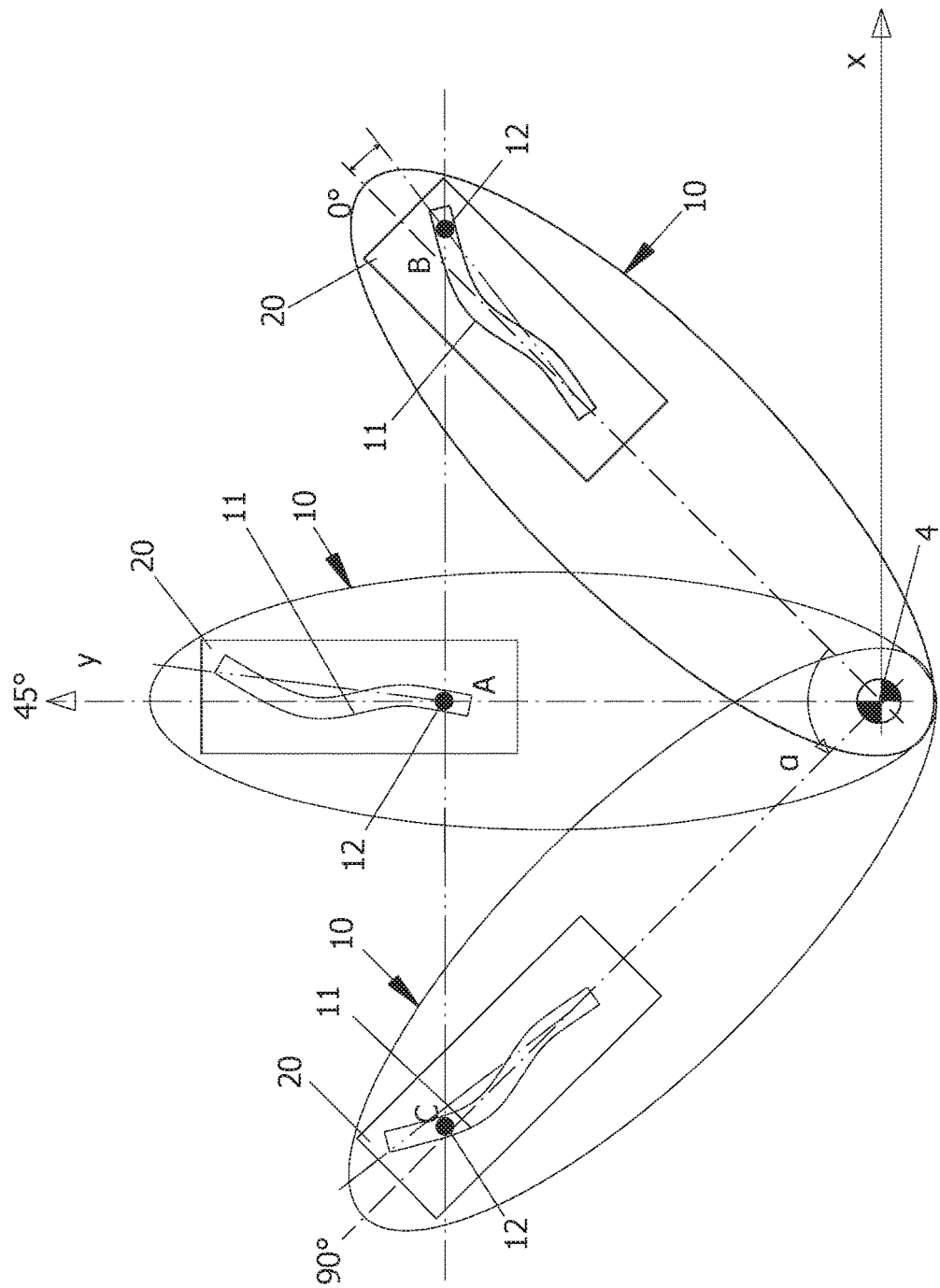

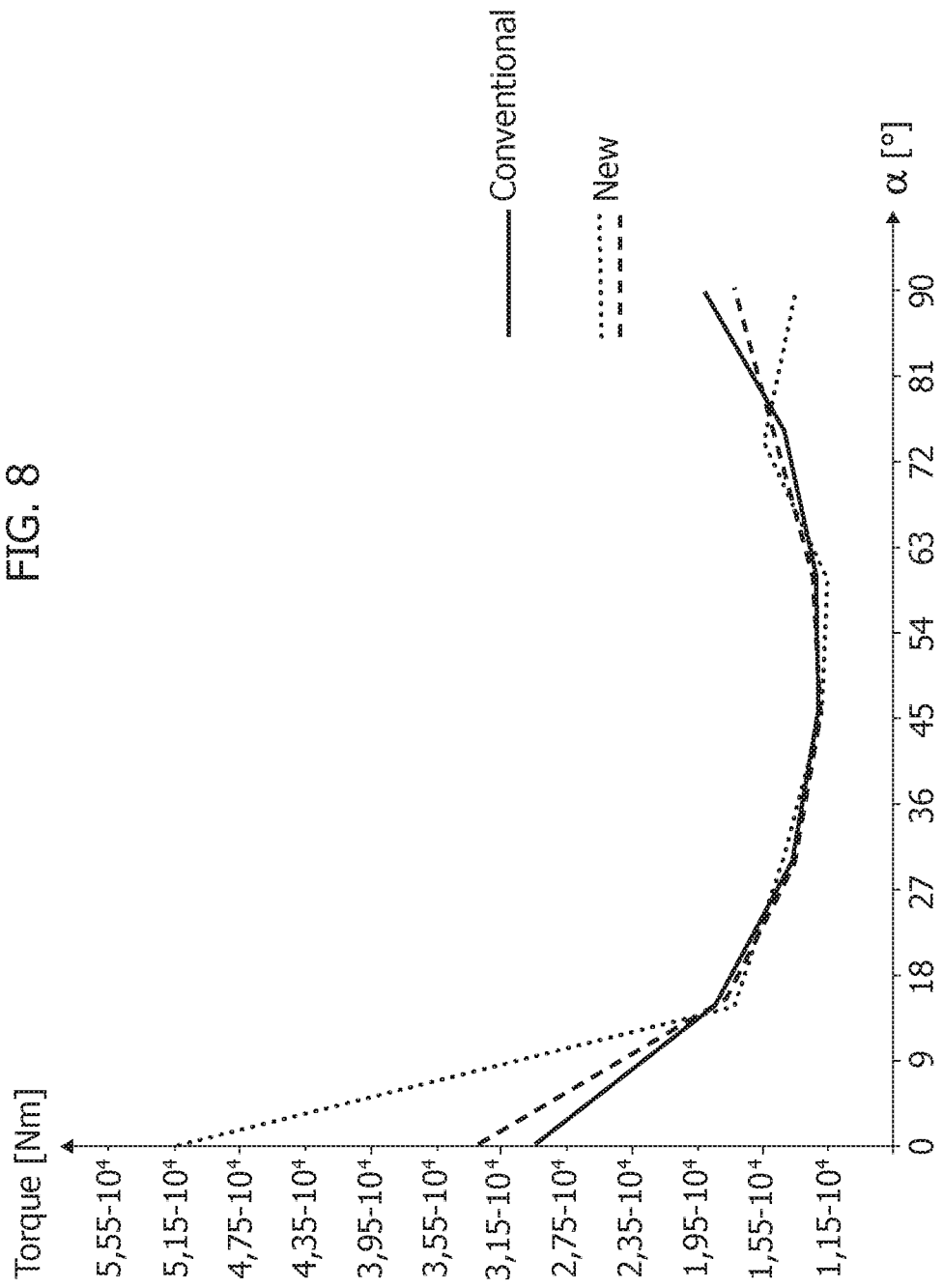

//\* USE CODE ``` \*\*

VALVE ACTUATOR DEVICE WITH DRIVING ARM HAVING A MODULAR STRUCTURE

CROSS-REFERENCE TO RELATED APPLICATIONS

This application is a 371 U.S. National Stage of International Application No. PCT/IB2015/059123, filed Nov. 25, 2015, which claims priority to Italian Application No. TO2014A000997 filed on Dec. 1, 2014. The disclosure of each of the above applications is incorporated herein by reference in their entirety.

FIELD OF THE INVENTION

The present invention relates to valve actuator devices, of the type comprising:
- a supporting body;
- a valve driving shaft, rotatably mounted on the supporting body around a main axis; and
- a fluid cylinder for controlling rotation of said driving shaft, including:
  - a cylinder body, which is connected to said supporting body, on one side thereof and has an axis directed transversely to said main axis, said axes being arranged in mutually perpendicular planes;
  - a piston slidably mounted in the cylinder body; and
  - a rod connected to the piston and carrying a cam-follower member;

the valve actuator further comprising:
- at least one driving arm, which is connected to said driving shaft and has a body and a cam track in form of a slot, cooperating with said cam-follower member in such a way that a displacement of the piston of said fluid cylinder between two end operating positions causes a rotation of said driving arm between two end operating positions.

Devices of this type frequently, but not necessarily always, comprise also a fail-safe safety device for recalling said driving arm towards a safety position corresponding to one of the said end operating positions, said safety device comprising a casing fixed to said supporting body on a side opposite to said fluid cylinder and having an axis parallel to the axis of the fluid cylinder, a piston disk slidably mounted within said casing, a rod connected to said piston disk and connected to said cam-follower member, and a helical spring contained in said casing and tending to recall the driving arm towards said safety position.

Actuator devices of this sort are used for controlling valves of various kinds, in particular large-sized valves, in systems of various types. The actuator is able to control the movable member of the valve between a complete closed condition and a complete opened condition enabling in certain cases also modulation of the flow rate of fluid through the valve, positioning the movable member of the valve in an intermediate position between its two end positions. In a conventional application, the driving shaft of the actuator performs a rotation of 90° for displacing the movable member of the valve between its opened and closed positions.

An actuator device of the type referred to above is for example disclosed in U.S. Pat. No. 4,350,081.

The driving torque that the actuator device is able to apply to the aforesaid valve driving shaft depends upon the force applied by the fluid cylinder to the driving arm (via engagement of the cam-follower member within the respective slot); this torque also depends upon the geometrical distance of the effective component of this force from the axis of the driving shaft. Each specific application requires in general a specific design of the actuator device in order to obtain desired values of the driving torque as a function of the angle of rotation of the driving arm. Each specific actuator device is hence characterized by a specific torque curve, i.e., by a specific variation of the driving torque as a function of the angle of rotation of the driving arm. Typically, in known actuator devices that have a slot with a linear profile, the maximum and minimum driving torques that can be obtained are necessarily linked to the dimensions of the device and in particular to the distance of the axis of the driving shaft from the axis of the fluid cylinder (which is the "theoretical" lever arm), whereas it would be desirable to be able to modify the effective lever arm of the device with respect to the axis of the driving shaft, without modifying the overall dimensions of the device.

OBJECT OF THE INVENTION

The object of the present invention is to provide an actuator device of the above indicated type that is adapted in general to be used in different applications which have requirements which may be very different from each other in relation to the driving torque to be applied and/or to the stresses to be withstood. A particular object of the invention is to provide an actuator device that can be adapted with simple and quick operations to any specific applications, in such a way as to present any desired profile of the curve of the driving torque. A further object of the invention is to enable the effective lever arm of the device with respect to the axis of the driving shaft to be changed, without modifying the overall dimensions of the device.

SUMMARY OF THE INVENTION

With a view to achieving the aforesaid object, the subject of the invention is a valve actuator device having all the characteristics that have been specified at the start of the present description and further characterized in that the aforesaid slot of the driving arm is formed in an insert constituting a separate element from the body of the aforesaid driving arm and adapted to be received and held in a seat of the body of the driving arm.

Thanks to the above indicated feature, the valve actuator according to the invention can be produced according to a modularity concept, by providing one and the same basic body for the driving arm and assembling thereon an insert each time selected from among a plurality of different inserts, so as to respond easily and quickly to the specific requirements of any individual application.

In the preferred embodiment, a plurality of inserts are provided in association to the actuator device, which can be selectively mounted on the driving arm, said inserts being different from each other in one or more of the following characteristics:
- the material forming the insert,
- the size of the insert and/or the slot formed in the insert,
- the shape of the slot, The aforesaid options are used according to the specific requirements of use and in particular according to the degree of stress to which the components of the actuator are subjected during operation and as a function of the variation curve of the driving torque required in each specific application.

The modular structure described above further enables a considerable reduction in the production costs, a standardization of the production, and preparation in a short time of a best configuration of the actuator according to the requirements of application. Finally, also the operations of maintenance are facilitated in so far as the parts subject to wear are easier and cheaper to replace. In particular, it is possible to replace only the aforesaid insert instead of the entire driving arm.

DESCRIPTION OF SOME PREFERRED EMBODIMENTS

Further characteristics and advantages of the invention will emerge from the ensuing description with reference to the annexed drawings, which are provided purely by way of non-limiting example and in which:

FIG. 5 is a schematic illustration of the basic principle of the present invention;

FIG. 6 is a further diagram showing the driving arm of the actuator device according to the present invention in three different operating conditions;

FIG. 7 illustrates a variant of FIG. 6; and

FIG. 8 illustrates a diagram showing the variation of the driving torque as a function of the angle of rotation of the driving shaft of the actuator, both for a device according to the known art and for two different devices according to the present invention.

Figure 1:
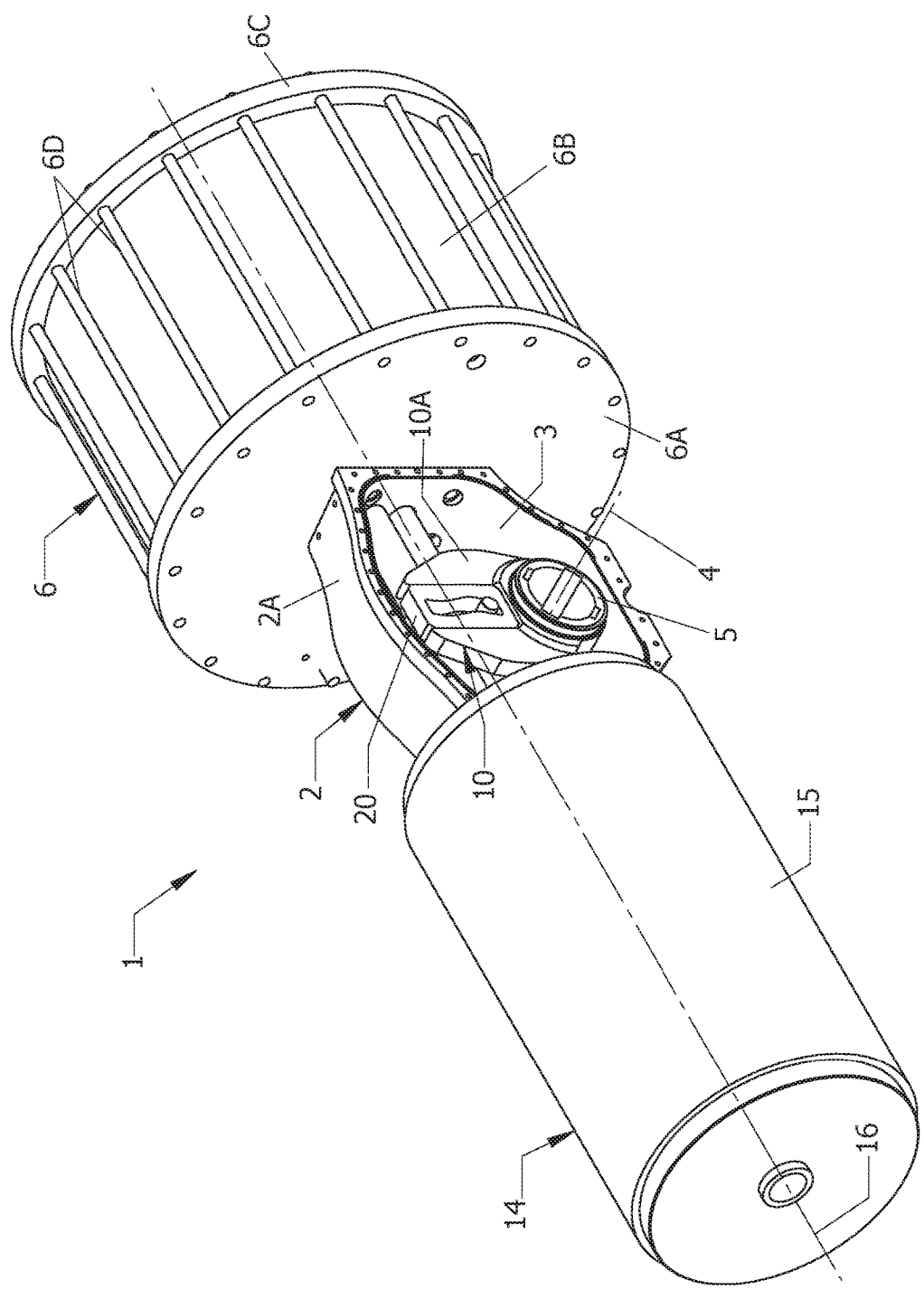
FIG. 1 is a partially sectioned perspective view of an example of embodiment of a valve-actuator device according to the present invention.

With reference to FIGS. 1-4, number 1 designates as a whole a valve-actuator device according to the present invention. The device 1 comprises a central supporting body 2 in the form of a metal casing constituted by an element 2A, screwed on which is a lid (not illustrated) to define a closed internal cavity 3. FIG. 1 (as likewise FIGS. 3 and 4) shows just one of the two elements 2A constituting the supporting body 2 in order to render visible the parts arranged within the cavity 3.

Figure 4:
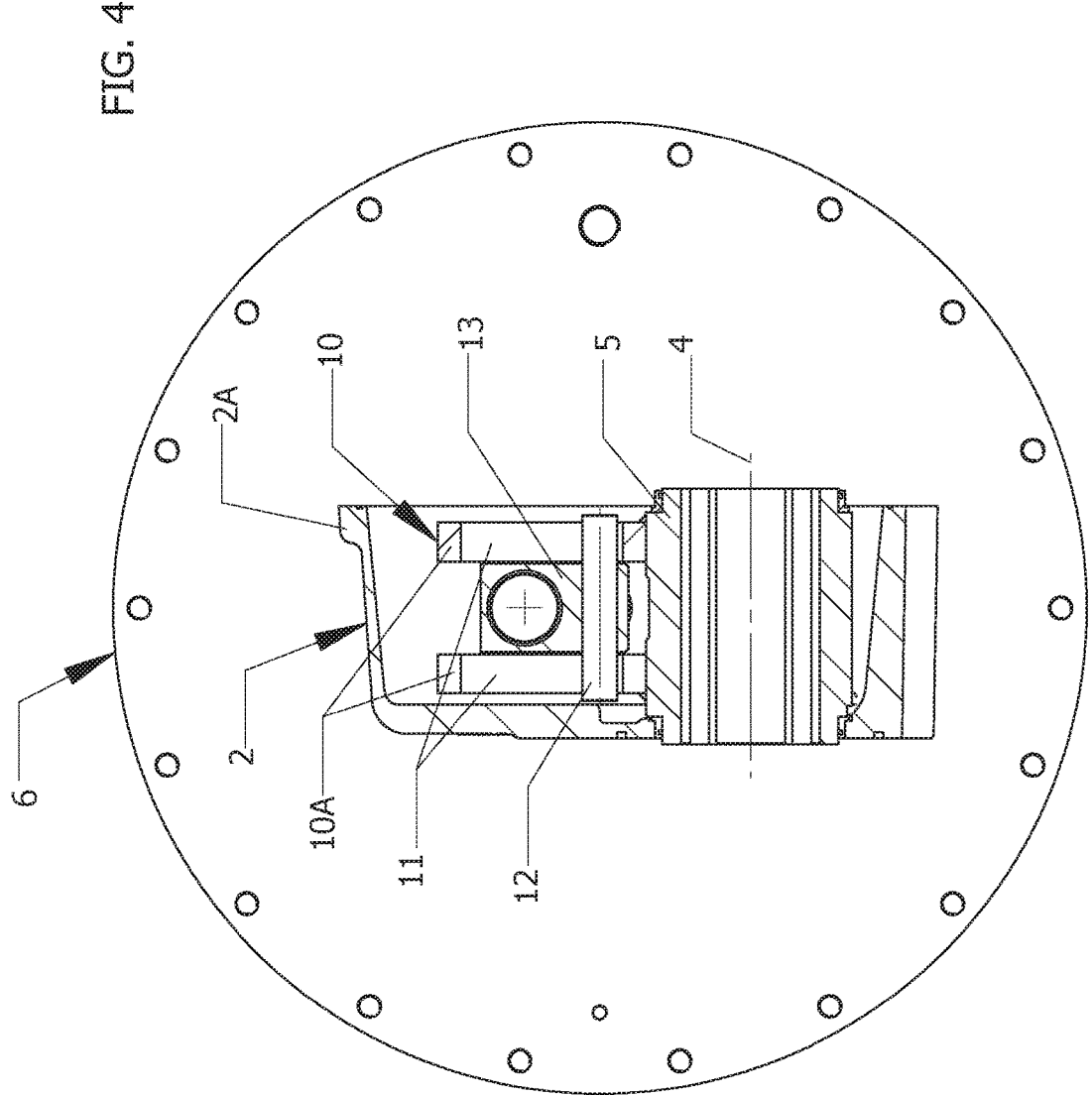

As may be clearly seen in FIG. 4, the central supporting body 2 supports a driving shaft 5 in rotation around a main axis 4. The driving shaft 5 is made in the form of an internally grooved bushing for receiving within it a driving rod (not illustrated) of the movable member of a valve. The bushing constituting the driving shaft 5 is rotatably mounted within the supporting body 2 by means of sliding or rolling bearings of any known type.

The actuator device according to the invention controls rotation of the driving shaft 5, which in turn governs rotation of the movable member of the valve between a completely closed position and a completely open position. According to a usual technique, the movable member of the valve may, for example, be of the type in which passage from the open position to the closed position of the valve occurs with a rotation of 90° around the main axis 4.

The example of embodiment illustrated herein regards an application with a rotation of from 0° to 90° (a quarter of a turn), with a tolerance of approximately 10° on the end values. However, in theory, the principle that underlies the invention is of general application. Moreover, the actuator device according to the invention may be used both for displacing the movable member of a valve between the position of complete opening and the position of complete closing, and possibly also, for the applications where this is required, for positioning the movable member of the valve in any intermediate position.

Rigidly connected on one side of the central supporting body 2 is an end plate 6A of the body of a fluid cylinder 6 designed to govern rotation of the driving shaft 5. The fluid cylinder 6 may be either a hydraulic cylinder or a pneumatic cylinder. The example illustrated regards in particular the case of a pneumatic cylinder. In any case, the cylinder 6 comprises a cylinder body having an axis 6X. The axis 6X of the cylinder 6 and the axis 4 of the driving shaft 5 are not incident with respect to one another, but are contained in mutually orthogonal planes. The cylinder body is defined by a cylindrical wall 6B closed at one end by the aforesaid end plate 6A and at the opposite end by an end plate 6C. In the example illustrated, the end plates 6A, 6C are held against the opposite ends of the cylindrical wall 6B by a plurality of screw-operated tie rods 6D.

Figure 3:
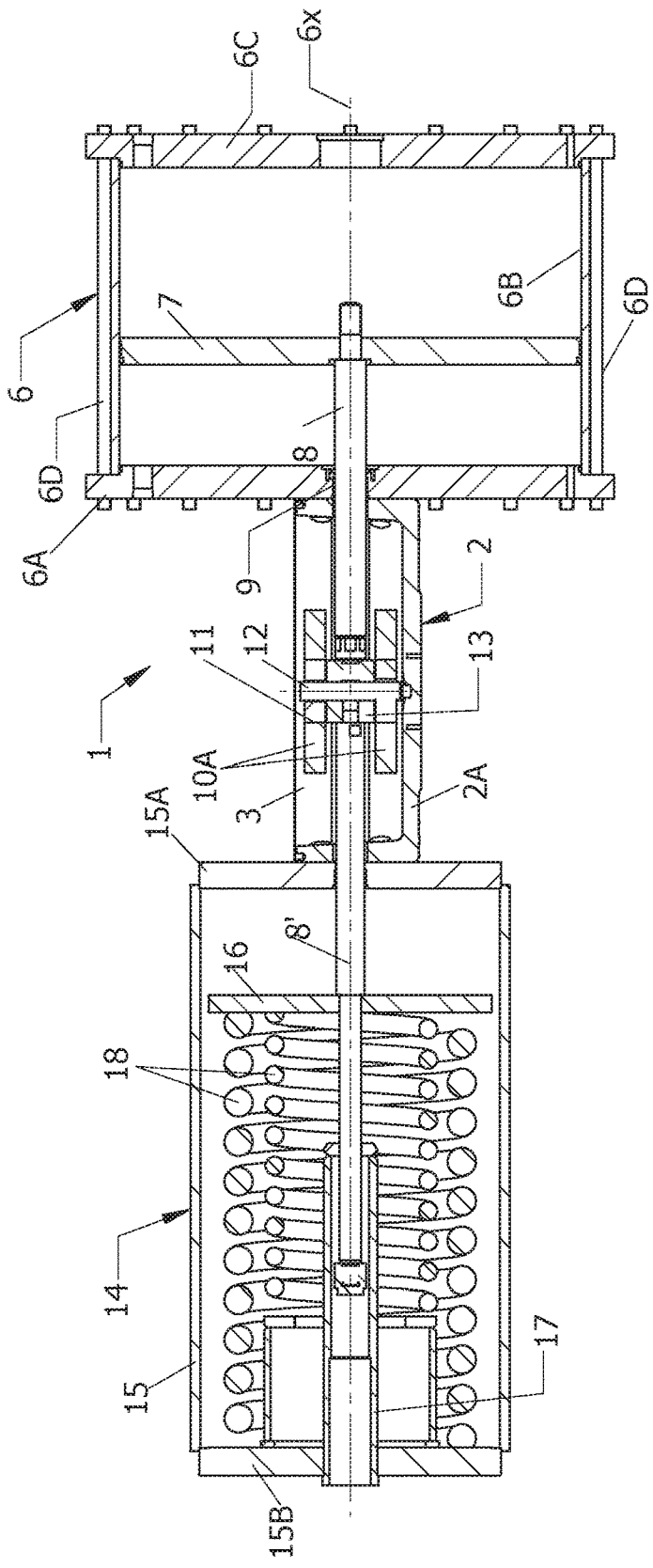
FIGS. 3 and 4 are cross-sectional views according to the lines III-III and IV-IV of FIG. 2.

With reference to FIG. 3, slidably mounted within the body of the cylinder 6 is a piston 7 rigidly connected to a rod 8 that is slidably mounted through a central opening of the end plate 6a and through a hole 9 of a side wall of the supporting body 2. Consequently, the rod 8 extends into the cavity 3 of the supporting body 2.

The rod 8 of the fluid cylinder 6 is designed to govern rotation of the driving shaft 5 by means of a pin-slot transmission, which enables conversion of the linear movement of the rod 8 into a rotation of the driving shaft 5 around the axis 4. For this purpose, rigidly connected on the driving shaft 5 is a driving arm 10 carrying a cam track in the form of a slot 11 engaged by a cam-follower pin 12 carried by the rod 8. As will be illustrated in greater detail in what follows, according to the present invention the slot 11 is formed in an insert 20 assembled on the body of the driving arm 10.

Figure 2:
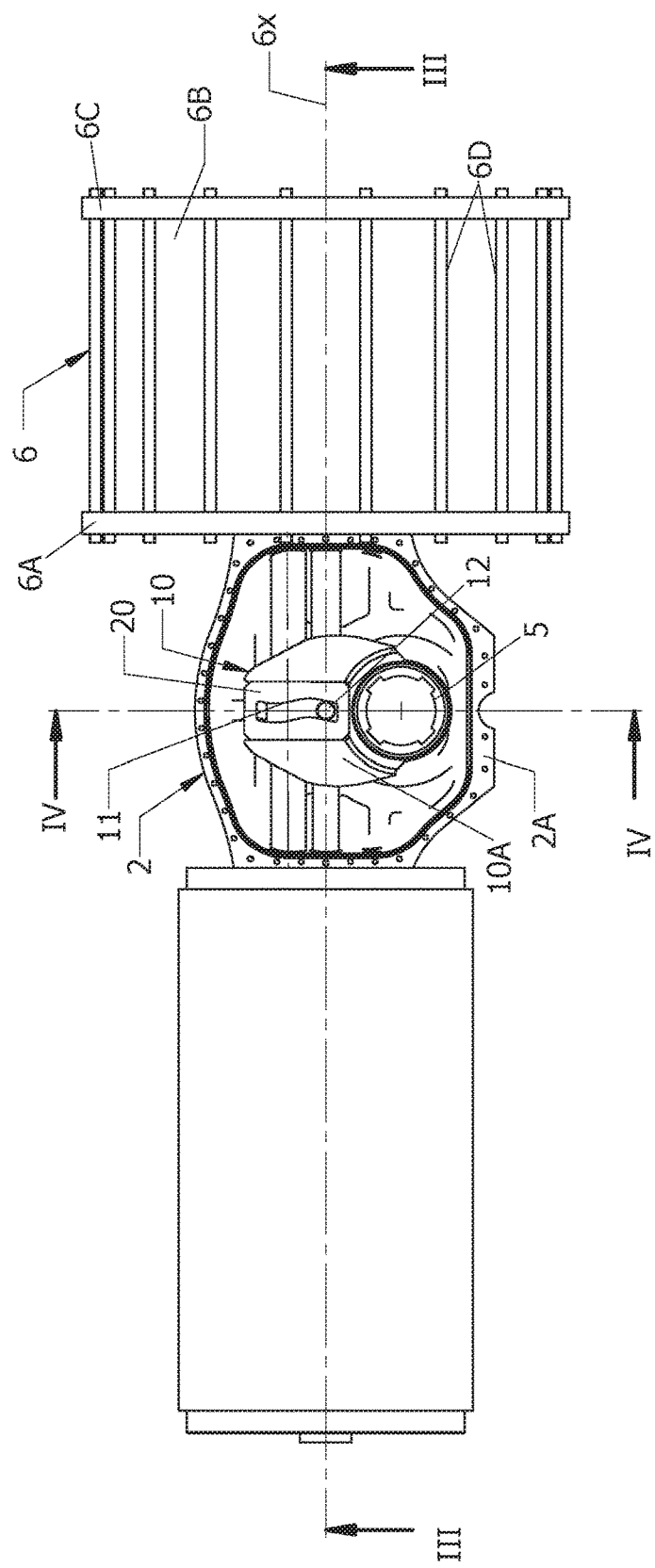
FIG. 2 is a side view of the device of FIG. 1.

With reference to the example illustrated in the annexed drawings, the driving arm 10 has a yoke conformation, with two plates 10A parallel and set apart from one another (see FIGS. 3 and 4), just one of which is visible in FIGS. 1 and 2. Once again in the particular case of the specific example illustrated, each of the plates 10A has an elongated ellipsoidal conformation, with one end rigidly connected on the driving shaft 5. The remaining part of the body of each plate 10A has a respective slot 11. As will likewise be illustrated in greater detail in what follows, according to the present invention the slot 11 is formed in an insert 20 assembled on each plate 10A. The slots 11 provided on the two plates 10A are identical to one another and identically positioned. These slots 11 are engaged by the ends of the cam-follower pin 12 (see in particular FIG. 4) that is carried by a block 13 rigidly connected to the rod 8. The pin 12 projects on opposite sides of the block 13 to engage the slots 11 provided in the plates 10A.

As referred to above, the two plates 10A constitute together the driving arm of the actuator device. Engagement of the cam-follower pin 12 within the slots 11 of the plates 10A enables conversion of the linear movement of the rod 8 of the fluid cylinder 6 into a rotation of the driving shaft 5, which transmits rotation to the control rod (not illustrated) of the movable member of the valve, this rod being coupled inside the bushing constituting the shaft 5.

Of course, the conformation described herein for the driving arm 10 is provided purely by way of example. The driving arm could have any other configuration and in particular could be constituted by a single plate having a single slot engaged by a cam-follower pin carried by the rod of the fluid cylinder.

With reference once again to FIGS. 1-3, the embodiment illustrated herein purely by way of example further comprises, in a way in itself known, a fail-safe safety device for recalling the driving arm 10 towards a safety position in the case of malfunctioning of the fluid cylinder 6 or of the syrod for supply of said fluid cylinder. The fail-safe safety device is designated as a whole by the reference number 14 and comprises a cylindrical casing 15 having an axis parallel to, and coinciding with, the axis 6X of the fluid cylinder 6. The casing 15 of the safety device 14 is rigidly connected, with an end wall thereof, to the central supporting body 2, on the side opposite to the fluid cylinder 6, in such a way that the supporting body 2 is set between the fluid cylinder 6 and the safety device 14. Slidably mounted in an end plate 15A of the casing 15 is a rod 8' that is set on the prolongation of the rod 8 and is also connected to the block 13 carrying the cam-follower pin 12. The rod 8' extends into the casing 15 and is rigidly connected to a movable piston disk 16 within the casing 15. In the case of the example illustrated, the end of the rod 8' located on the side opposite to the block 13 is slidably guided in a tubular element 17 projecting into the casing 15 and carried by an end plate 15B that closes the casing 15 on the side opposite to the supporting body 2. Operatively set between the piston disk 16 and the end plate 15B are one or more helical springs 18 that tend to recall the rod 8' towards the end position corresponding to a safety position of the driving arm 10.

Figure 1A:
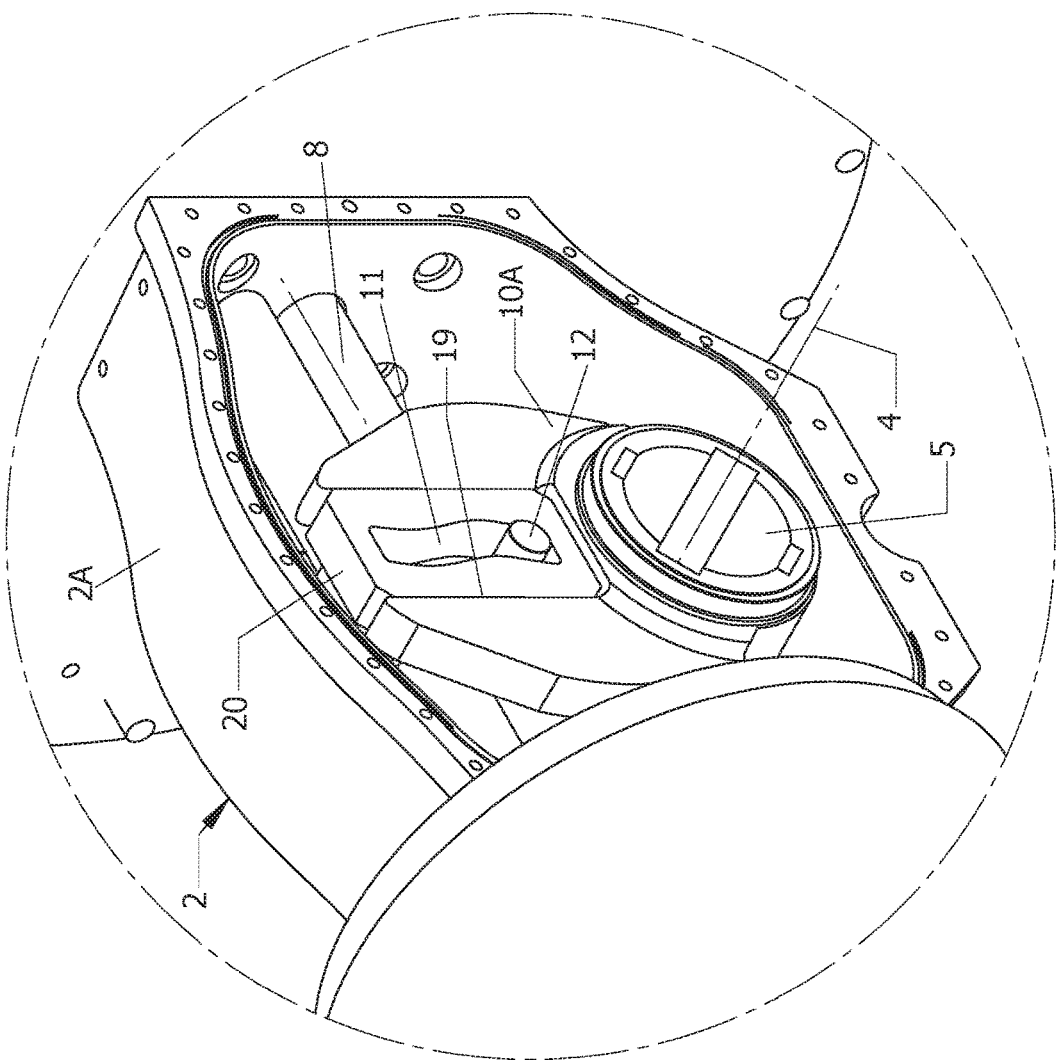
FIG. 1A illustrates at an enlarged scale a detail of FIG. 1.

According to an important characteristic of the present invention, each slot 11 is formed in an insert 20 constituting an element separate from the respective plate 10A and received in a seat 19 provided in the plate 10A (see FIG. 1A).

With reference to the specific example illustrated, the insert 20 is constituted, for example, by a prismatic block that is slidably received within the seat 19. The insert 20 is held within the seat 19 so as to be rigidly connected to the respective plate 10A, by means of any known technique, for example by an interference fit or using adhesive.

Of course, the solution consisting in the provision of the slot 11 in a separate insert, mounted on the driving arm 10, can be adopted with any other configuration of the driving arm, also different from the one illustrated herein purely by way of example.

According to the invention, it is possible to provide a single basic body 10 for the actuator device, and a plurality of inserts 20 (see FIG. 5), each characterized, for example, by a different conformation of the slot 11. It is likewise possible to provide inserts that differ, for example, as regards the material of which they are made, so as to obtain a structure having more or less high characteristics of strength or more or less high characteristics of lightness according to the specific application. Likewise, there may be provided inserts that differ as regards their configuration and dimensions. It is thus possible to configure in a simple and immediate way the actuator device on the basis of the requirements of the specific application.

It follows, in particular, that with the invention it is possible to produce, in a short time and with considerable saving in production costs, an actuator device provided with a slot having a specific conformation, according to the characteristics of movement that is to be imparted on the driving shaft as a function of the driving torque required.

Finally, constituting a further aspect of the present invention (that forms the subject also of a co-pending patent application filed in the name of the present applicant) is the fact that the slot 11 presents, in particular, a conformation such as to render possible easy adaptation of the device to the requirements of each specific application, enabling a desired profile of the driving torque to be obtained. FIGS. 6 and 7 show two examples of slots obtained in conformance with this further aspect of the present invention. A basic characteristic of these slots is that they have a curved profile, corresponding to a polynomial function of a degree higher than 2. Studies and experiments conducted by the present applicant have proven that in this way it is possible to obtain particularly advantageous profiles of the torque curve. In a preferred embodiment, this curved profile is substantially S-shaped.

Each of FIGS. 6 and 7 shows schematically the two end operating positions and the intermediate position of the driving arm 10 of the actuator device according to the invention, with reference to an application provided by way of example in which a total rotation of 90° of the arm 10 is envisaged. With reference to FIG. 6, when the driving arm 10 is in the end position appearing further to the right in the figure, the pin 12 is located at one end B of the slot 11. Starting from this position, the pin 12 is shifted towards the left (as viewed in the figure) in the direction of the axis 6X of the cylinder 6. Consequently, the driving arm 10 is forced to turn in a counterclockwise direction around the main axis of rotation 4. The pin 12 reaches the opposite end A of the slot 11 when the arm 10 has performed a rotation of 45° and is consequently located in a position exactly intermediate between the two end positions. If the pin 12 continues to be displaced towards the left (as viewed in FIG. 6) by the fluid cylinder 6, the pin 12 causes a further counterclockwise rotation of the driving arm 10 until the end position illustrated to the left in FIG. 6 is reached. During this second part of the rotation, the pin 12 again traverses the slot 11 from the end A to the end B of the slot.

In the case of FIG. 6, the slot 11 formed in each insert 20 is S-shaped, with the ends A, B of the slot aligned in a radial direction R that exits from the axis of rotation 4. FIG. 7 shows a variant in which the slot has a slightly different conformation.

Studies conducted by the present applicant have shown that configurations of the type illustrated in FIGS. 6 and 7 enable different profiles of the torque curve to be obtained with one and the same driving arm.

FIG. 8 illustrates by way of example a diagram that shows the variation of the driving torque as a function of the angle of rotation of the driving arm, both for a conventional device and for the two variants of FIGS. 6 and 7. As may be seen, the slot conformation envisaged in these variants (which, as already mentioned, forms the subject of a co-pending patent application filed in the name of the present applicant) enables a marked increase of the driving torque to be obtained in the proximity of the end positions of the driving arm, at 0° and at 90°, with a larger increase in the proximity of the 0° position (corresponding to the position illustrated on the right in FIGS. 5, 6, and 7).

Of course, to return to the exemplification illustrated in FIG. 5 of the basic principle of the present invention, a number of inserts 20 with different slot conformations may be provided, which include slots either having the improved shape described above, with an S-shaped curved configuration, or, instead, having a conventional rectilinear shape oriented in a direction that may be aligned to the radial direction R or be inclined with respect thereto.

Of course, without prejudice to the principle of the invention, the details of construction and the embodiments may vary widely with respect to what has been described and illustrated herein purely by way of example, without thereby departing from the scope of the present invention.

The invention claimed is:

1. A valve actuator device, comprising:
   a supporting body (2);
   a driving shaft (5) for actuating a valve, rotatably mounted on the supporting body (2) around a main axis (4); and
   a fluid cylinder (6) for controlling rotation of said driving shaft (5), including:
   a cylinder body (6A, 6B, 6C), connected to said supporting body (2), on one side thereof, and having an axis (6X) directed transversely to said main axis (4), said axes (6X, 4) being arranged in mutually perpendicular planes;
   a piston (7) slidably mounted within the cylinder body (6A, 6B, 6C); and
   a rod (8) connected to the piston (7) and carrying a cam-follower member (12),
   said valve actuator device further comprising:
   a driving arm (10), connected to said driving shaft (5), having a body and a cam track in a form of a slot (11), cooperating with said cam-follower member (12) in such a way that a displacement of the piston (7) of said fluid cylinder (6) between two end operating positions causes a rotation of said driving arm (5) between two end operating positions,
   wherein said slot (11) is formed in an insert (20) constituting a separate element from the body of said driving arm (10) and adapted to be received and held in a seat (19) of the body of the driving arm (10).

2. The valve actuator device according to claim 1, wherein a plurality of inserts (20) are provided in association thereto, which are configured to be selectively mounted on the driving arm (10), each of said plurality of inserts being different from each other in one or more of the following characteristics:
   the material forming the insert (20),
   the size of the insert (20) and/or the slot (11) formed in the insert (20),
   the shape of the slot (11),
   in such a way that said actuator device is configured to be quickly prepared according to different configurations, in response to specific needs of an application of the valve actuator device.

3. The valve actuator device according to claim 1, wherein said driving arm (10) comprises a body in a form of a flat plate, having one end connected to said driving shaft (5) for rotating therewith and a remaining part having said seat (19) within which there is slidably received said insert (20).

4. The valve actuator device according to claim 1, wherein said slot (11) is a rectilinear slot.

5. The valve actuator device according to claim 4, wherein said slot is aligned along a radial direction (R) perpendicular to said main axis (4).

6. The valve actuator device according to claim 4, wherein said rectilinear slot (11) is directed according to a direction (R') inclined with respect to a radial direction (R) perpendicular to said main axis (4).

7. The valve actuator device according to claim 1, wherein said slot (11) has a curved profile, defined by a polynomial function with a degree greater than 2.

8. The valve actuator device according to claim 7, wherein said curved profile is substantially S-shaped.

9. The valve actuator device according to claim 8, wherein said S-shaped curved profile of the slot (11) has opposite ends (A, B) aligned along a direction (R) intersecting the main axis (4) orthogonally.

10. The valve actuator device according to claim 8, wherein said S-shaped curved profile of the slot (11) has opposite ends (A, B) aligned along a direction (R') inclined with respect to a direction (R) intersecting said main axis (4) orthogonally.

11. The valve actuator device according to claim 1, wherein the body of said driving arm (10) is formed as a yoke, with two flat plates (10A) parallel and spaced from each other, each plate having one seat (19) which receives therewithin a respective insert (20) with one slot (11).

12. The valve actuator device according to claim 1, further comprising a fail-safe safety device (14) for biasing said driving arm (10) towards a safety position corresponding to one of said end operating positions, said safety device (14) comprising a casing (15) fixed to said supporting body (2) on an opposite side with respect to said fluid cylinder (6) and having an axis parallel to the axis (6X) of the fluid cylinder (6), a plunger (16) movably mounted within said housing (15), a rod (8') connected to the plunger (16) and connected to said cam-follower member (12), and at least one helical spring (18) contained within said casing (15) and tending to bias said driving arm (10) towards said safety position.

13. A method for production of an actuator device according to claim 1, wherein body (10, 10A) is provided for said driving arm and also a plurality of inserts (20) are provided which are configured to be selectively associated to the body (10), said plurality of inserts comprising at least one insert (20) with a slot (11) aligned along a radial direction (R) perpendicular to the main axis of rotation (4) or inclined with respect thereto, and at least one insert (20) with a curved slot (11) having its opposite ends aligned according to the radial direction (R) perpendicular to the main axis of rotation (4) or along a direction (R') inclined with respect to said radial direction (R), and wherein said method further comprises selecting one of said inserts (20) and mounting the selected insert (20) on the body of the driving arm (10) as a function of a specific application requirement of the valve actuator device.

\* \* \* \* \*